UNITED STATES PATENT OFFICE.

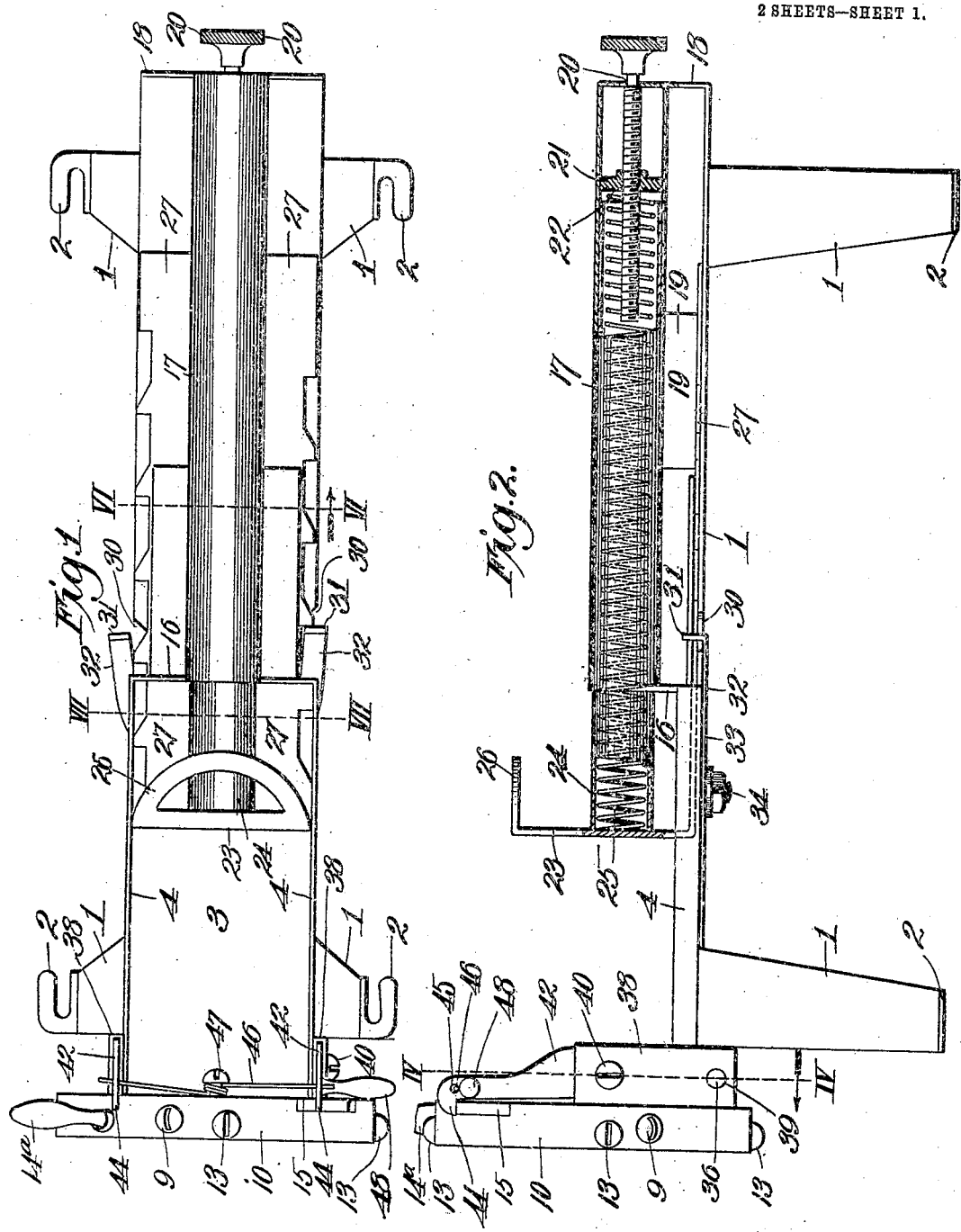

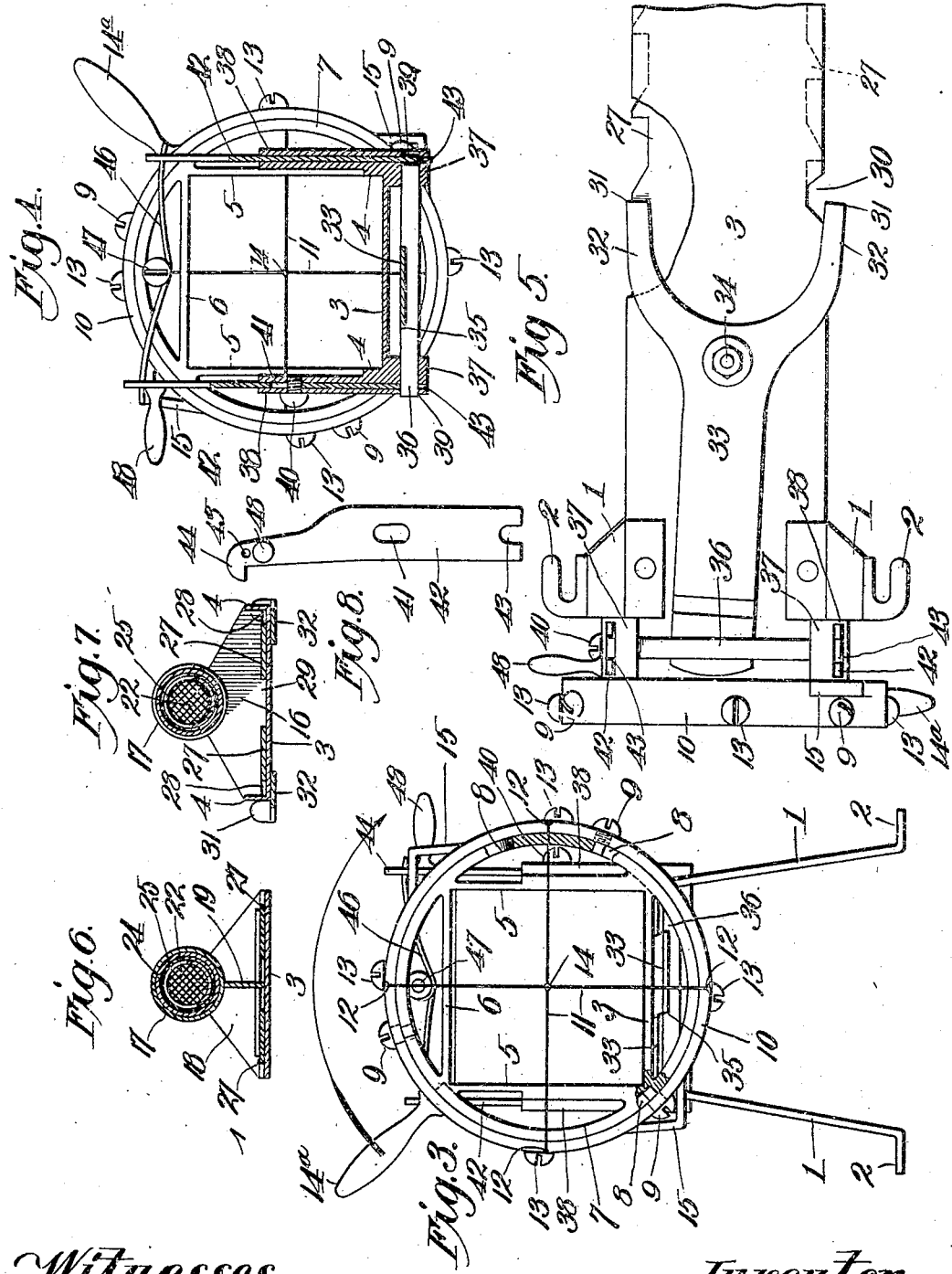

FRANK W. BILLINGS, OF KANSAS CITY, MISSOURI.

BUTTER-PAT-MAKING DEVICE.

954,608.     Specification of Letters Patent.     Patented Apr. 12, 1910.

Application filed April 29, 1909. Serial No. 492,994.

*To all whom it may concern:*

Be it known that I, FRANK W. BILLINGS, a citizen of the United States, residing at Kansas City, in the county of Jackson and State of Missouri, have invented certain new and useful Improvements in Butter-Pat-Making Devices, of which the following is a specification.

This invention relates to butter-pat making devices and my object is to produce a device of the character named in which a piece of butter can be quickly transformed into a plurality of small rectangular pieces suitable or appropriate for individual serving.

A further object is to produce a device of the character outlined which can be operated efficiently and reliably and which embodies the desirable features of simplicity, strength, durability, compactness and cheapness of construction.

With these general objects in view and others as hereinafter appear, the invention consists in certain novel and peculiar features of construction and organization as hereinafter described and claimed; and in order that it may be fully understood reference is to be had to the accompanying drawings, in which;—

Figure 1, is a top plan view of a device embodying my invention. Fig. 2, is a side view of the same partly broken away. Fig. 3, is a front view partly broken away. Fig. 4, is a vertical section on the line IV—IV of Fig. 2. Fig. 5, is an inverted plan view of a part of the device. Fig. 6, is a cross section on the line VI—VI of Fig. 1. Fig. 7, in a cross section on the line VII—VII of Fig. 1. Fig. 8, is a side view of one of the triggers of the device.

In the said drawings, 1 indicates legs or frames provided with notched feet 2, for convenience of attachment to a bench or table, not shown, and secured upon said legs or frames is a bed-plate 3 provided for a part of its length with flanges 4 and at its extreme front end with an inverted U-shaped frame consisting of side walls 5 rising from and flush with flanges 4, and a bridge or top 6 connecting the upper ends of walls 5 and forming in conjunction with the latter and the bed-plate and flanges thereof, a rectangular die of which the sides and top are slightly beveled at their rear edges to facilitate the passage of butter cleanly through the die. Surrounding said frame and preferably cast integral therewith, is a circular rim 7 provided with a plurality of circumferentially extending slots 8 receiving the inner ends of guide-screws or pins 9 carried by a rotary cutter, consisting of a ring 10 journaled on the rim 7, and crossed wires 11, which wires are adapted at times to form partitions sub-dividing the rectangular die into four sections or openings, one of the crossed wires being adapted when the rotary frame attains the extreme limits of its movement to alternately occupy a horizontal and a vertical position, the other crossed wire occupying a horizontal position or a vertical position accordingly as the first-named wire occupies a vertical or horizontal position. The crossed wires not only form sub-divisions or partitions for the rectangular die but incidentally act as cutters as hereinafter explained, as they operate in the plane of the front face or edge of the rectangular die and are secured at their extremities to and in grooves 12 of the rotary frame by means of clamping bolts 13, and are also secured rigidly together at their crossing point by solder at 14, or otherwise.

To operate the rotary cutter it is provided with an outwardly-projecting handle 14ª and it is also equipped at diametrically opposite points and at opposite sides of and equal distances from the handle by preference, with a pair of V-shaped cams 15, for a purpose which hereinafter appears.

The rear ends of flanges 4 are connected by a cross piece 16 forming a support for the front end of a tube 17 arranged parallel with the bed-plate and concentrically with respect to the axis of the circular rim 7, the said tube being also supported by an upwardly-projecting end-piece 18 and by an intermediate support 19 of the bed-plate, and journaled in the rear end of the tube 17 is a screw 20 equipped with a threaded nut 21 having its front face roughened by preference, as at 22.

A butter feeding follower consists of a presser-head 23 of form and size to fit with comparative snugness in the rectangular die, and a hollow cylindrical stem 24 fitting slidingly in tube 17 and containing an expansive coiled spring 25 bearing at its front end against the presser-head and at its rear end against the roughened face of nut 21, and exerting sufficient pressure against said nut to prevent the same turning when the screw 20 is turned to impart forward or rearward movement to the nut for the purpose of increasing or relaxing the tension of the spring. The presser-head is provided with a rearwardly-projecting loop 26 as a handle for conveniently effecting adjustment of the follower toward the rear end of the bed-plate as hereinafter explained. To compel the follower to advance with a step-by-step movement, the following mechanism is provided. 27 is a pair of parallel rack-bars resting upon the bed-plate and projecting rearwardly from the presser-head through guide-openings 28 in the lower edge of the cross-piece 16, the tongue 29 of said cross-piece depending between the rack-bars and coöperating with the flanges 4 in compelling the follower to reciprocate without swerving in any direction. The teeth of the rack-bars are of the ratchet-tooth type and are spaced apart, the teeth of one rack-bar being staggered with respect to those of the other, the distance between the vertical planes of the abrupt faces of the teeth of the two bars determining the length of each step or movement of the follower and hence the thickness of the pats of butter severed from the mass by the rotary cutter, as hereinafter explained. The bed-plate is provided with a pair of notches 30 with which successively register the spaces or notches between the teeth of the rack-bars as the latter advance with the follower, to alternately receive the upwardly-projecting ends 31 of the tines 32 of a forked lever 33 pivoted at 34 to the underside of the bed-plate and engaging a notch 35 in a transverse locking bolt 36 projecting slidingly through a pair of lugs 37 depending from the bed-plate at opposite sides and near the front end of the same, and secured to the outer sides of said lugs are a pair of vertical keepers 38 provided with holes 39 in line with and adapted alternately to receive the bolt. Vertically above its hole 39 one of the keepers is provided with a stop-pin or screw 40 extending through vertical slot 41 in one of a pair of reciprocatory triggers 42 mounted in the keepers and vertically bifurcated at their lower ends at 43, the upper ends of said reciprocatory triggers terminating in hooks 44 overhanging the frame or ring of the oscillatory cutter and in the path of movement of the V-shaped cams 15. The reciprocatory triggers are provided with holes 45 receiving the ends of a spring 46 secured upon a bolt 47 carried by the rim 7, said spring exerting a downward pressure on the triggers, which pressure disposes one of said triggers between the hole 39 of its respective keeper and the bolt at the same instant the companion trigger is raised out of the path of the other end of the bolt to permit the latter to be projected into the hole of the other keeper and thus prevent the depression of the superposed trigger.

Assuming that the parts are arranged as shown in the drawings and that a pound or other large piece of butter is placed upon the bed-plate in front of the presser-head, the operator grasps handle 14$^a$ and swings it a quarter revolution, as indicated by the arrow, in Fig. 3. In the initial part of this movement the cam 15 holding one of the triggers elevated is withdrawn from under the hook end of said trigger. The other cam at the end of such movement passes under and raises the depressed trigger against the resistance of the spring 46. The instant the last-named trigger is withdrawn from the path of the bolt 36 the spring 25 throws the bolt out of the path of the first-named trigger and into the path of the last-named or elevated trigger by causing the teeth of the rack-bar engaged with the forked end of the lever 31 to rock said lever, the said engaging tine of the lever being forced outward beyond said tooth to permit the same to pass, the other tine at the same time swinging into the registering notch 30 of the bed-plate and the path of one of the teeth of the adjacent rack-bar so as to limit the advance movement of the presser-head, which in such movement slides the piece of butter forwardly on the bed-plate. The handle 14 is then swung back to its original position and a repetition of the operations described occurs. At the end of a second or a subsequent operation of the handle, the butter is forced through the rectangular die a distance corresponding to one of the step-by-step movements of the presser-head and as a result the crossed wires produce crossed grooves or kerfs in the front end of the piece of butter.

The next oscillation of the cutter causes the horizontal wire and the vertical wire to respectively assume a vertical and a horizontal position and thus cut off the front end of the piece of butter projecting forwardly beyond the rectangular die, the four rectangular pats of butter thus made being appropriate for individual serving. Four additional pats of butter are produced with each subsequent operation of the rotary cutter until the presser-head has completed its forward movement at which time its face occupies the plane of the front edge of the rectangular die. At the same time one of the tines of the lever is in engagement with one of the rack-bars beyond its rearmost tooth and thus prevents the spring 25 from forcing the presser-head farther forward in the event that the oscillatory cutter is again operated. If provision were made to prevent further advance of the presser-head careless operation would result in a breakage of the crossed wires. To move the plunger rearwardly preliminary to charging the device with another piece of butter to be transformed into pats, the trigger which is depressed into the path of the bolt and thus prevents pivotal movement of the lever, must be raised so as to leave unobstructed the hole in its respective keeper, and for the convenient elevation of such trigger it is provided with a laterally-projecting handle 48. While holding said trigger elevated the operator grasps handle 26 and pulls the presser-head rearward, the bevel edges of the teeth of the rack-bars rocking the lever and therefore sliding the bolt back and forth. When the plunger is drawn back the required distance the upward pressure on handle 48, is removed to permit the spring 46 to redepress the trigger and thus lock the plunger against advance movement until the trigger is again raised, it being understood of course that the trigger should be raised alternately by the cams of the cutter so that said triggers shall be alternately depressed by the actuating spring and thus compel the presser-head to advance with a step-by-step movement.

From the above description it will be apparent that I have produced a butter pat making device which operates efficiently and reliably and which also embodies the other features of advantage enumerated in the statement of the object of the invention, and I wish it to be understood that I reserve the right to make such changes in the form, proportion, detail construction and arrangement of the parts as properly fall within the spirit and scope of the appended claims.

Having thus described the invention what I claim as new and desire to secure by Letters-Patent, is:

1. A butter-pat making device, comprising a bed-plate, a die rigid therewith, means to feed butter along the bed-plate and through the die with a step-by-step movement, and an oscillatory cutter to kerf the end of the butter projecting beyond the die and rotate in a plane at right angles to such step-by-step movement and sever the butter in the plane of the face of the die in the interim between the step-by-step movements.

2. A butter-pat making device, comprising a bed-plate, a die, means to feed butter along the bed-plate and through the die with a step-by-step movement and an oscillatory cutter embodying a pair of crossed wires bridging the die at its front face and adapted as the step-by-step movements occur to kerf the end of the butter projecting beyond the die and to rotate and cut off such projecting portion at the base of said kerfs in the interim between the step-by-step movements.

3. A butter-pat making device, comprising a bed-plate, a die rigid therewith, an oscillatory cutter consisting of a suitably-journaled ring surrounding the die and crossed wires bridging the front face of the die, means to feed butter along the bed-plate and through the die and the openings formed in the cutter by the crossed wires thereof, with a step-by-step movement, and a handle by which the cutter may be oscillated in the interim between the step-by-step movements, to cause the crossed wires to sever the portion of the butter projecting through said openings.

4. A butter-pat making device, comprising a bed-plate, a die rigid therewith, an oscillatory cutter embodying a pair of crossed wires bridging the die one perpendicular to the bed-plate and the other at right angles to the perpendicular one, means to limit the oscillations of the cutter to one quarter revolution, a presser-head movable along the bed-plate and into the side, a locking bolt, a pair of yieldingly-actuated triggers for alternately locking the bolt against movement, means movable with the cutter for alternately tripping said triggers, means for advancing the presser-head each time the bolt is unlocked by the tripping of a trigger, and means actuated by the movements of the presser-head for projecting the bolt into the path of the tripped trigger and withdrawing it from the path of the other trigger to permit the last-named trigger to lock the bolt against reverse movement and effect the arrest of the presser-head.

5. A butter-pat making device, comprising a bed-plate, a die rigid therewith, an oscillatory cutter embodying a pair of crossed wires bridging the die, one perpendicular to the bed-plate and the other at right angles to the perpendicular one, means to limit the oscillations of the cutter to one quarter revolution, a presser-head movable along the bed-plate and into the die, a locking bolt, a pair of yieldingly-actuated triggers for alternately locking the bolt against movement, means movable with the cutter for alternately tripping said triggers, means for advancing the presser-head each time the bolt is unlocked by the tripping of a trigger, a lever mounted on the bed-plate and connected at one end to the bolt to operate the same endwise, and a pair of means movable with the presser-head for alternately rocking the lever in opposite directions the instant the triggers are tripped.

6. A butter-pat making device, comprising a bed-plate, a die rigid therewith, an oscillatory cutter embodying a pair of crossed wires bridging the die, one perpendicular to the bed-plate and the other at right angles to the perpendicular one, means to limit the oscillations of the cutter to one quarter revolution, a presser-head movable along the bed-plate and into the die, a locking bolt, a pair of yieldingly-actuated triggers for alternately locking the bolt against movement, means movable with the cutter for alternately tripping said triggers, means for advancing the presser-head each time the bolt is unlocked by the tripping of a trigger, a lever mounted on the bed-plate and connected at one end to the bolt to operate the same endwise, and a pair of rack-bars movable with the presser-head and adapted to alternately rock said lever in opposite directions as the triggers are tripped.

7. A butter-pat making device, comprising a bed-plate, a die rigid therewith, a cutter, comprising an oscillatory ring surrounding the die and crossed wires secured at their ends to and extending diametrically across the ring at right angles to each other, means to limit the oscillations of the cutter to one quarter revolution, a lever pivoted to the base, a bolt movable endwise by the lever, a yieldingly-depressed trigger locking the bolt, a second yieldingly-depressed trigger bearing against the side of the bolt, a presser-head to move along the bed-plate, rack-bars movable with the presser-head, the teeth of one of the rack-bars bearing a staggered relation to those of the other, a lever pivoted to the bed-plate, having one end engaged with the bolt to reciprocate the same and the other end forked to produce a pair of tines for alternate engagement with the said rack-bars, means movable with the cutter for tripping the depressed trigger out of the path of the bolt, and a spring to simultaneously advance the presser-head and cause one of the rack-bars to push the engaging tine out of its path and thereby rock the lever to cause the other tine to move into the path of a tooth of the other rack-bar and the bolt to move endwise into the path of the elevated trigger to hold the same elevated and out of the path of the other trigger to permit the same to be depressed and lock the bolt.

8. A butter-pat making device, comprising a bed-plate, a die rigid therewith, a cutter, comprising an oscillatory ring surrounding the die and crossed wires secured at their ends to and extending diametrically across the ring at right angles to each other, means to limit the oscillations of the cutter to one-quarter revolution, a bolt movable endwise, a yieldingly-depressed trigger locking the bolt, a second yieldingly-depressed trigger bearing against the side of the bolt, a presser-head to move along the bed-plate, rack-bars movable with the presser-head, the teeth of one of the rack-bars bearing a staggered relation to those of the other, a lever pivoted to the bed-plate, having one end engaged with the bolt to reciprocate the same and the other end forked to produce a pair of tines for alternate engagement with the said rack-bars, means movable with the cutter for tripping the depressed trigger out of the path of the bolt, a spring to simultaneously advance the presser-head and cause one of the rack-bars to push the engaging tine out of its path and thereby rock the lever and cause the other tine to move into the path of a tooth of the other rack-bar and the bolt to move endwise into the path of the elevated trigger to hold the same elevated and out of the path of the other trigger to permit the same to be depressed and lock the bolt, and a second means actuated by the reverse oscillation of the cutter to trip the depressed trigger out of the path of bolt to permit the presser-head-actuating spring to again advance the presser-head and cause one of the rack-bars to push the engaging tine out of its path and rock the lever in the reverse direction to its first movement to dispose the other tine in the path of a tooth of the other rack-bar and reverse the movement and dispose the bolt in the path of the trigger to hold the same tripped out of the path of the other trigger to permit the same to be depressed and lock the bolt in its new position.

9. A butter-pat making device, comprising a bed-plate provided with side flanges, vertical side bars rising from said flanges and a horizontal top bar connecting the upper ends of the side bars, a circular rim surrounding the rectangular die formed conjointly by the bed-plate, said side flanges, side bars and top bar, an oscillatory cutter, consisting of a ring journaled on said rim and wires extending diametrically across said ring at right angles to each other, one of the wires extending parallel with the sides of the die and the other with the top of the die, a handle projecting from the cutter, and means to limit the range of oscillatory movement of the cutter to ninety degrees.

In testimony whereof I affix my signature, in the presence of two witnesses.

FRANK W. BILLINGS.

Witnesses:
HELEN C. RODGERS,
G. Y. THORPE.